US008238491B2

(12) United States Patent
Naito et al.

(10) Patent No.: US 8,238,491 B2
(45) Date of Patent: Aug. 7, 2012

(54) DEVICE AND METHOD FOR DEMODULATING CONTROL SIGNALS

(75) Inventors: Kosuke Naito, Tokyo (JP); Motoya Iwasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 676 days.

(21) Appl. No.: 12/401,853

(22) Filed: Mar. 11, 2009

(65) Prior Publication Data

US 2009/0232258 A1 Sep. 17, 2009

(30) Foreign Application Priority Data

Mar. 13, 2008 (JP) ................. 2008-063982

(51) Int. Cl.
*H03D 1/00* (2006.01)
(52) U.S. Cl. ........ 375/343; 375/136; 375/137; 375/142; 375/143; 375/144; 375/145; 375/147; 375/150; 375/259; 375/260; 375/340
(58) Field of Classification Search .......... 375/136–137, 375/142–145, 147, 150, 259, 324, 340, 343, 375/260
See application file for complete search history.

(56) References Cited

U.S. PATENT DOCUMENTS

2008/0186880 A1* 8/2008 Seki et al. ................ 370/281
2008/0253484 A1* 10/2008 Kakura et al. ............ 375/343

FOREIGN PATENT DOCUMENTS

| EP | 2034638 A | 3/2009 |
| EP | 2068477 A | 6/2009 |
| JP | 2005072927 A | 3/2005 |
| WO | 2008041675 A | 4/2008 |

OTHER PUBLICATIONS

Kawamura et al. "Orthogonal Pilot Channel Using Combination of FDMA and CDMA in Single-Carrier FDMA-Based Evolved UTRA Uplink", Mar. 2007, IEEE, Wireless Communications and Networking Conference.*
NEC Group, "Definition of Cyclic Shift in Code Division Multiplexing", 3GPP TSG RAN WG1 Meeting 47, RIGA, vol. 1. R1-063202. No. 47, Nov. 6, 2006, p. 1-4, XP002505590.
3GPP TS36.211 v1.2.1, Technical Specification Group Radio Access Network, Evolved Universal Terrestrial Radio Access (E-UTRA), Physical Channels and Modulation (Release 8), Jul. 2007, p. 17-18.
3GPP TSG RAN WG1 #48bis, R1-071294, Qualcomm Europe, "Link Analysis and Multiplexing Capability for CQI Transmission", Mar. 26-30, 2007, p. 1-6, St. Julian, Malta.

(Continued)

*Primary Examiner* — Chieh M Fan
*Assistant Examiner* — Sophia Vlahos (57) ABSTRACT

A device performs demodulation of control signals from multiple radio terminals, based on the correlations in the frequency domain between a predetermined code and the orthogonalized control signals and reference signals of the multiple radio terminals obtained by cyclic shifts of the predetermined code. The device includes: a demultiplexer which demultiplexes a reference signal component and a control signal component based on a correlation profile; a path detector which detects a path location or path locations for each radio terminal based on the power values of the reference signal components; extractor which extracts the correlation values of the reference signal components and the correlation values of the control signal components, respectively; and RAKE combiner which combines the extracted values.

13 Claims, 6 Drawing Sheets

OTHER PUBLICATIONS

3GPP TSG RAN WG1 #44bis, R1-060925, Texas Instruments, "Comparison of Proposed Uplink Pilot Structures for SC-OFDMA", Mar. 27-31, 2006, Athens, Greece.

B. M. Popovic, "Generalized Chirp-Like Polyphase Sequences with Optimum Correlation Properties", IEEE Transactions on Information Theory, vol. 38, No. 4, Jul. 1992, pp. 1406-1409.

3GPP TSG RAN WG1 Meeting #47bis, R1-070359, NEC Group, "Definition of Cyclic Shift in Code Division Multiplexing", Jan. 15-19, 2007, Sorrento, Italia.

Extended Search Report in Counterpart EP Patent Application No. 09003632, Nov. 2, 2009, NEC Corporation.

* cited by examiner

DEVICE AND METHOD FOR DEMODULATING CONTROL SIGNALS

This application is based upon and claims the benefit of priority from Japanese Patent Application No. 2008-063982, filed on Mar. 13, 2008, the disclosure of which is incorporated herein in its entirety by reference.

BACKGROUND OF THE INVENTION

1. Field of the Invention

The present invention relates to a radio communications system and, more particularly, to a method and device for demodulating control signals in a radio communications system in which reference signals and control signals are transmitted according to code division multiplexing (CDM).

2. Description of the Related Art

The 3rd Generation Partnership Project (3GPP), which is a collaboration among organizations aiming to standardize radio communications systems, has been studying Long Term Evolution (LTE), which provides a high-speed, low-latency, and packet-optimized radio access technology, as a successor to current W-CDMA systems. In LTE, single-carrier transmission is adopted as the uplink access scheme in broadband radio access. With low PAPR (peak to average power ratio), the single-carrier transmission is excellent in power efficiency, compared with multi-carrier transmission such as Orthogonal Frequency Division Multiplexing (OFDM). Hence, the single-carrier transmission is an access scheme suitable for an uplink from a mobile station to a base station. A mobile station is also referred to as "user equipment" or "UE" such as a mobile terminal having limited battery capacity. A base station is also referred to as "Node B" or "eNB".

Moreover, for uplink reference signal (also referred to as "pilot signal") sequences, Constant Amplitude Zero Auto-Correlation (CAZAC) sequences are used (see 3GPP TS36.211 v1.2.1). The CAZAC sequences are sequences having constant amplitude in the time domain as well as in the frequency domain and also having zero autocorrelation except when the phase difference is zero (e.g. B. M. Popovic, "Generalized Chirp-Like Polyphase Sequences with Optimum Correlation Properties," IEEE Transactions on Information Theory, Vol. 38, No. 4, pp 1406-1409, July 1992). Because of the constant amplitude in the time domain, the CAZAC sequences can achieve low PAPR, and because of the constant amplitude in the frequency domain, the CAZAC sequences are suitable for frequency-domain channel estimation.

When a CAZAC sequence is used for uplink reference signal sequences, Code Division Multiplexing (CDM) is used to multiplex the reference signals of multiple mobile stations (see 3GPP R1-060925, Texas Instruments, "Comparison of Proposed Uplink Pilot Structures For SC-OFDMA," March 2006). In CDM of reference signals, users can use CAZAC sequences of the same length respectively, and orthogonality between the reference signals can be accomplished by a cyclic shift unique to each user (mobile station) or each antenna. Hereinafter, the cyclic shift will be described briefly.

Figure 1:
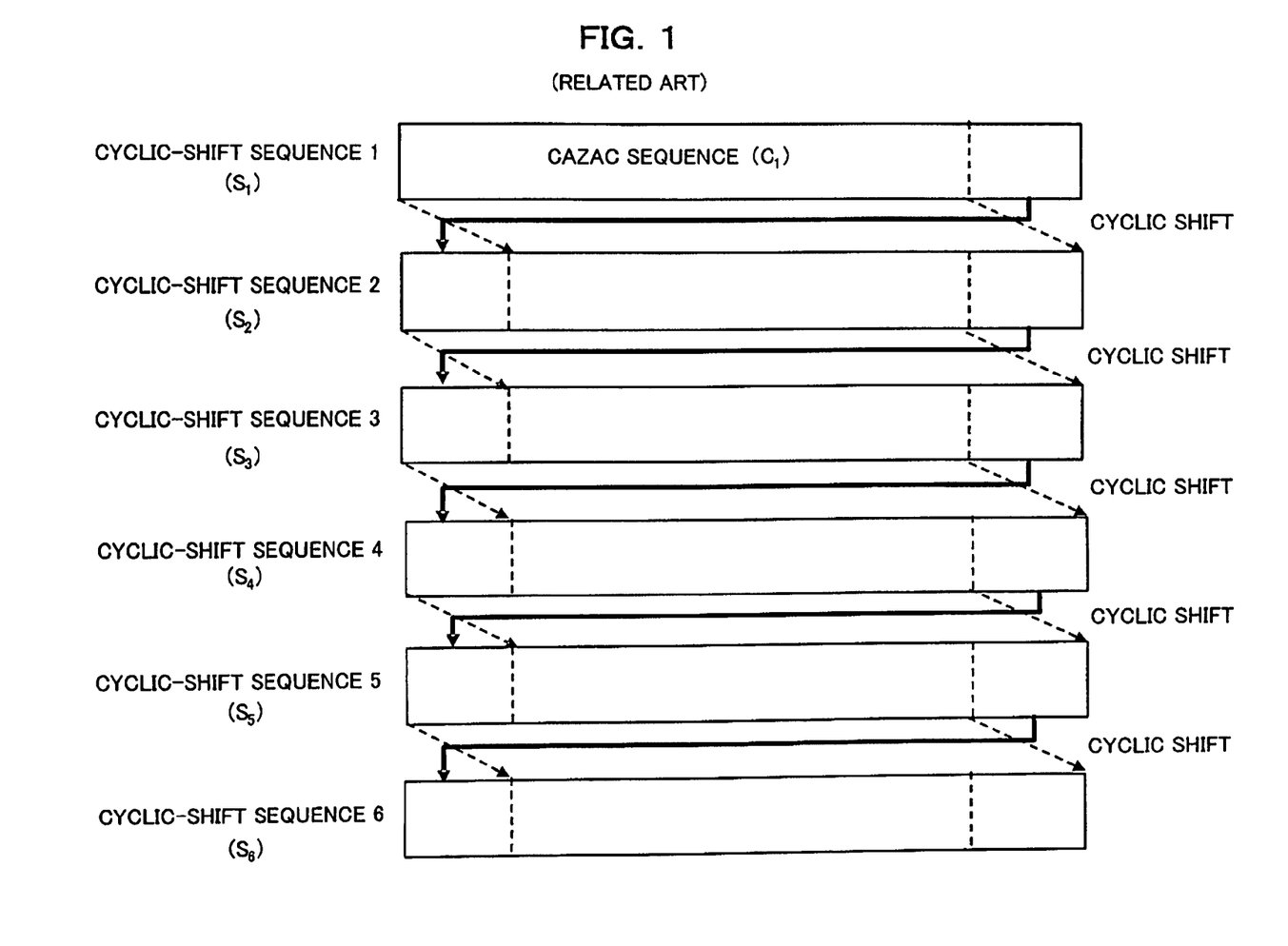
FIG. 1 is a schematic diagram to describe cyclic shifts based on a CAZAC sequence.

FIG. 1 is a schematic diagram to describe cyclic shifts based on a CAZAC sequence. Referring to FIG. 1, assuming that a CAZAC sequence $C_1$ is a sequence 1, a sequence 2 is made by shifting the sequence 1 rightward (in the drawing) and relocating the shifted-out part at the end of the sequence 1 to the top of the sequence 1. Moreover, a sequence 3 is made by shifting the sequence 2 rightward (in the drawing) and relocating the shifted-out part at the end of the sequence 2 to the top of the sequence 2. By sequentially shifting the sequence in a ring manner as described above, sequences 4, 5 and 6 are made. This is called cyclic shift, and CAZAC sequences generated by cyclic shifts are referred to as cyclic-shift sequences. Hereinafter, the cyclic-shift sequences will be represented by $S_1$, $S_2$ and so on by using numbers that indicate shifted amounts.

Since the autocorrelation value of a CAZAC sequence is always zero except when the phase difference is zero as mentioned above, orthogonality between multiple reference signals can be accomplished even in a multi-path environment by making the amount of a cyclic shift to be relocated from the end of a sequence to the top thereof equal to or larger than a supposed maximum delay path time. For example, in a propagation path model according to LTE, since the maximum delay path time is approximately 5 μsec and a single long block is 66.6 μsec long, it is possible to use, logically, 13 cyclic-shift sequences from the calculation of 66.6/5. However, it is thought that approximately six cyclic-shift sequences can be orthogonalized in actuality because an impulse response is broadened along a path due to the influence of a filter and the like (see 3GPP R1-071294, Qualcomm Europe, "Link Analysis and Multiplexing Capability for CQI Transmission," March 2007).

In LTE, reference signals (hereinafter, abbreviated as "RS" where appropriate) for the uplink can be broadly classified into three types: data demodulation reference signal for demodulation of Physical Uplink Shared Channel (PUSCH), which mainly transmits data; control signal demodulation reference signals for demodulation of Physical Uplink Control Channel (PUCCH), which transmits a control signal; and reference signals for measurement of uplink channel quality, or reference signals for CQI measurement (hereinafter, referred to as "sounding RS" or "sounding reference signal").

Figure 2:
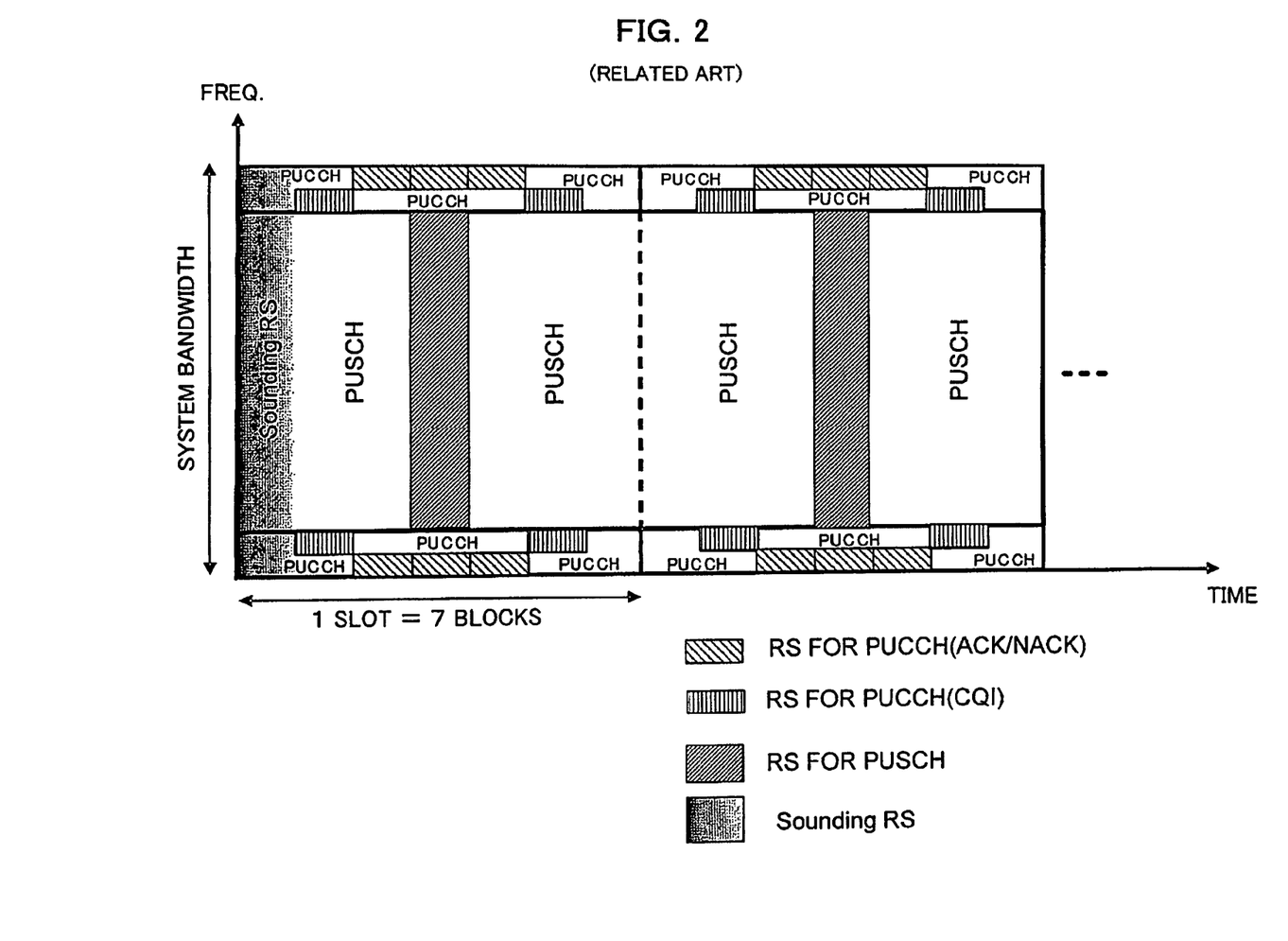
FIG. 2 is a format diagram showing an example of resource allocation in a slot including PUSCH and PUCCH, demodulation reference signals for PUSCH and PUCCH, and a sounding reference signal.

FIG. 2 is a format diagram showing an example of resource allocation in a slot including PUSCH and PUCCH, demodulation reference signals for PUSCH and PUCCH, and a sounding reference signal. One slot is composed of seven blocks. Resource blocks (RB) on the edges of the entire band are allocated to PUCCH. PUCCH and PUSCH are multiplexed by frequency division multiplexing (FDM). Additionally, one resource block includes 12 subcarriers.

Moreover, PUCCH and the demodulation reference signal for PUCCH, as well as PUSCH and the demodulation reference signal for PUSCH, are multiplexed by time division multiplexing (TDM) in their respective bands. The sounding reference signal is assigned a resource of the system bandwidth, independently of the demodulation reference signals for PUCCH and PUSCH.

In control signal (PUCCH) transmission as shown in FIG. 2, to obtain a larger frequency diversity effect, it is defined in standardization to use CDM, by which PUCCH users to be multiplexed are spread across the PUCCH bandwidth. In this event, orthogonality between the users can be accomplished as in the above-described CDM of reference signals, by using CAZAC sequences as spreading codes. Moreover, CDM is also used in multiplexing of users of the control signal (PUCCH) demodulation reference signals so that a certain number of CAZAC sequences can be secured without a reduction in the sequence length of the reference signals.

For channel estimation for multiple user equipments UE multiplexed by CDM, a frequency-domain cross-correlation method can be used (see, FIG. 2 in 3GPP R1-070359, NEC Group, "Definition of Cyclic Shift in Code Division Multiplexing," January 2007). As an example, a description will be given of channel estimation for four user equipments UE1 to UE4.

Figure 3:
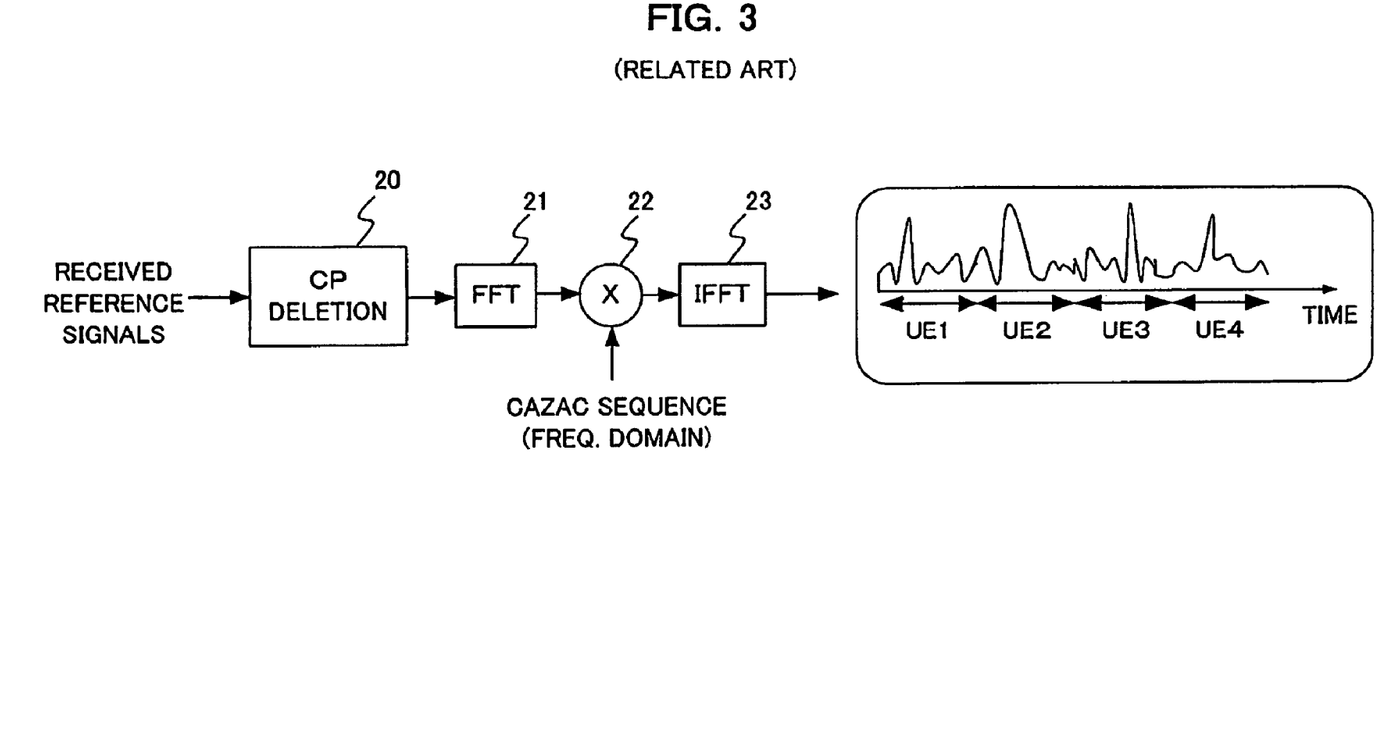
FIG. 3 is a block diagram showing a basic configuration of a multi-user channel estimation device.

FIG. 3 is a block diagram showing a basic configuration of a multi-user channel estimation device. Referring to FIG. 3, after a CP deletion section 20 deletes cyclic prefixes (CP) from received signals, a fast Fourier transform (FFT) section 21 transforms the signals into frequency-domain representations. Subsequently, a multiplication processing section 22 carries out complex multiplication of the frequency-domain received signals with a single CAZAC sequence which has been transformed into a frequency-domain representation similarly. An inverse fast Fourier transform (IFFT) section 23 retransforms the result of this multiplication into a time-domain representation, whereby a cross-correlation signal based on the respective cyclic shift delays assigned to the user equipments UE1 to UE4 can be obtained. In accordance with the uplink or downlink signal reception qualities thus estimated, data rate control is performed.

An example of a channel demodulation method used in a CDMA receiver is disclosed in JP2005-72927. In this receiver, path search is performed by using delay profiles that represent a distribution of signal power values corresponding to individual path delays. Moreover, this receiver includes channel estimation sections and channel demodulation sections correspondingly to a predetermined number of demodulation paths obtained by the path search. After phase adjustment of demodulated symbols is performed, the paths are combined by a RAKE section, thereby obtaining a combined demodulated symbol.

However, different multiplexing methods are used for uplink control signals and data signals, as in the above-described case where control signals are multiplexed by CDM and data signals are multiplexed by TDM/FDM. In such a case, if demodulation processing of control signals is performed by using a similar configuration that is used for demodulation processing of data signals, the processing cannot be performed suitably to the characteristics of the control signal transmission method, resulting in degraded efficiency.

Moreover, according to the configuration disclosed in JP2005-72927, channel estimation and channel demodulation need to be carried out for each user. Consequently, efficiency is reduced in throughput as well as in circuit scale.

SUMMARY OF THE INVENTION

Accordingly, an object of the present invention is to provide a control signal demodulation method and device that can perform demodulation processing of control signals efficiently.

According to the present invention, a device for demodulating a control signal received from each of a plurality of radio terminals based on correlation in frequency domain between a predetermined code and a reception signal including control signals and reference signals received from the plurality of radio terminals, wherein orthogonality between the control signals and orthogonality between the reference signals are accomplished by cyclic shifts of the predetermined code, includes: a demultiplexer for demultiplexing a reference signal component and a control signal component from a correlation profile of the correlation in frequency domain; a path detector for detecting a path location of each radio terminal from power of the reference signal component; an extractor for extracting a reference signal correlation value from the reference signal component corresponding to the path location and a control signal correlation value from the control signal component corresponding to the path location; and a combiner for combining the reference signal correlation value and the control signal correlation value to generate a control signal of each of the plurality of radio terminals.

According to the present invention, a method for demodulating a control signal received from each of a plurality of radio terminals based on correlation in frequency domain between a predetermined code and a reception signal including control signals and reference signals received from the plurality of radio terminals, wherein orthogonality between the control signals and orthogonality between the reference signals are accomplished by cyclic shifts of the predetermined code, includes: demultiplexing a reference signal component and a control signal component from a correlation profile of the correlation in frequency domain; detecting a path location of each radio terminal from power of the reference signal component; extracting a reference signal correlation value from the reference signal component corresponding to the path location and a control signal correlation value from the control signal component corresponding to the path location; and combining the reference signal correlation value and the control signal correlation value to generate a control signal of each of the plurality of radio terminals.

According to the present invention, it is possible to efficiently perform demodulation processing of respective control signals from multiple radio terminals multiplexed by cyclic shifts of a predetermined code.

DETAILED DESCRIPTION OF THE PREFERRED EMBODIMENTS

1. Configuration

Figure 4:
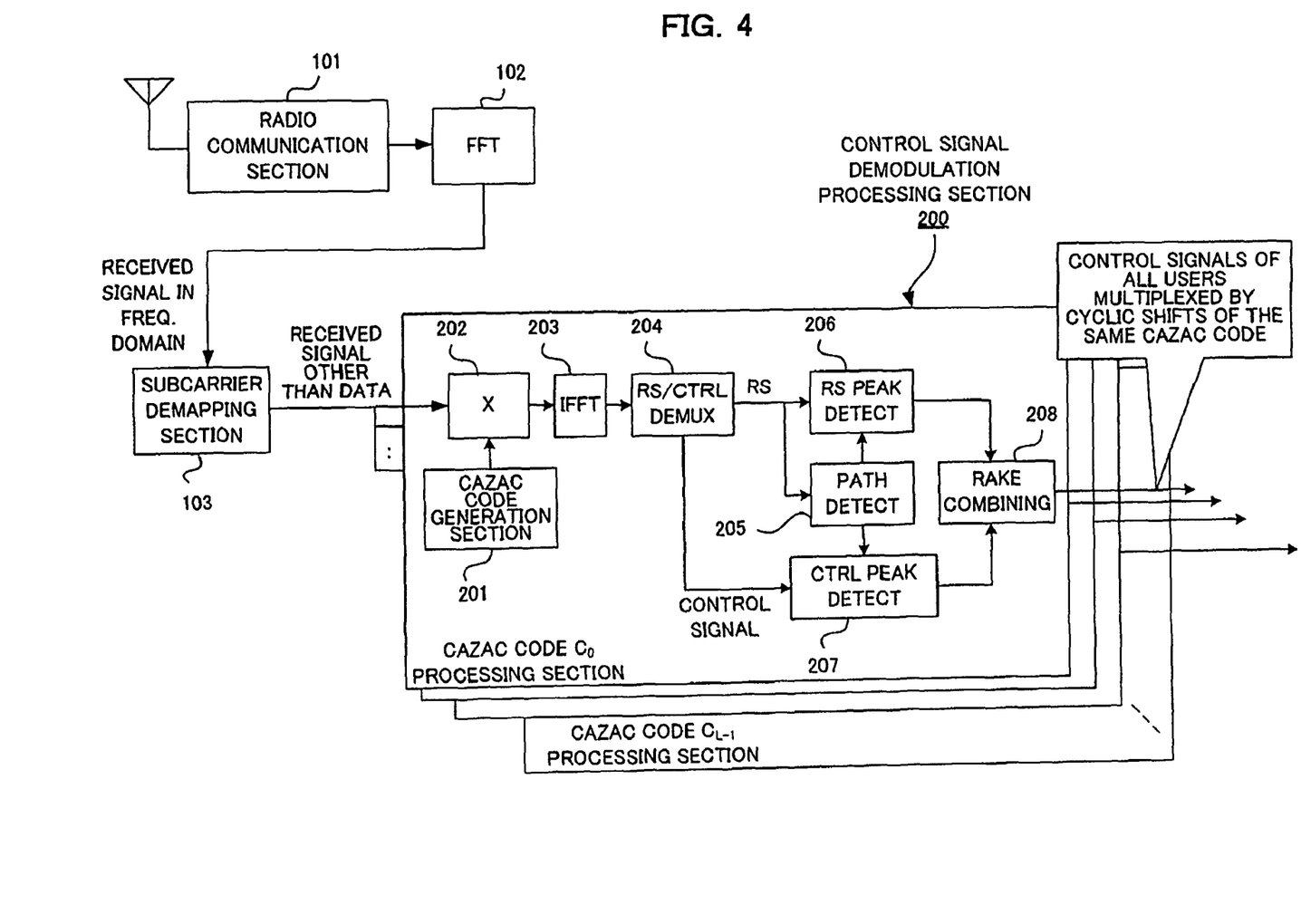
FIG. 4 is a block diagram showing a functional configuration of a radio communication device incorporating a control signal demodulation device according to an exemplary embodiment of the present invention.

FIG. 4 is a block diagram showing a functional configuration of a radio communication device incorporating a control signal demodulation device according to an exemplary embodiment of the present invention. Here, it is assumed that a CAZAC code is used as a predetermined code, that a signal received by a radio communication section 101 is transformed into a frequency-domain representation by a fast Fourier transformer (FFT) 102, and that the frequency-domain received signal is input to a subcarrier demapping section 103. The subcarrier demapping section 103 extracts from the frequency-domain received signal those subcarriers that are assigned to control signals and reference signals other than data signals, and outputs the extracted subcarriers to a control signal demodulation processing section 200.

The control signal demodulation processing section 200 is composed of L separate control signal demodulation processing sections corresponding respectively to L CAZAC codes $C_0$ to $C_{L-1}$ used in the system. As will be described next, each control signal demodulation processing section demodulates in a batch the control signals of multiple users multiplexed by cyclic shifts of its corresponding CAZAC code. Since the control signal demodulation processing sections corresponding to the individual CAZAC codes have the same configuration, the control signal demodulation processing section corresponding to the CAZAC code $C_0$ shown in FIG. 4 will be described hereinafter as an example.

The control signal demodulation processing section corresponding to the CAZAC code $C_0$ includes a CAZAC code generation section 201 that generates the CAZAC code $C_0$ and a multiplication processing section 202. The multiplication processing section 202 multiplies the received signal input from the subcarrier demapping section 103 by the CAZAC code $C_0$ in the frequency domain, and the result of this multiplication is transformed into a time-domain signal by the inverse fast Fourier transformer (IFFT) 203.

In the time-domain signal transformed by the IFFT 203, reference signals (RS) and PUCCH control signals are time-division-multiplexed as shown in FIG. 2. Therefore, the reference signals and control signals are demultiplexed by a demultiplexing section 204. A path detection section 205 detects an effective path location from the delay profile of each user, which is defined by the amount of cyclic shifting, and outputs the detected effective path locations to each of a peak value extraction section 206 for extracting reference signal peak values and a peak value extraction section 207 for extracting control signal peak values. This will be described specifically later.

The peak value extraction section 206 extracts, from a sequence of the reference signals demultiplexed by the demultiplexing section 204, correlation values at the points corresponding to the individual path locations and outputs the extracted correlation values, as coefficients of RAKE combining, to a RAKE combining section 208. The peak value extraction section 207 extracts, from a sequence of the control signals demultiplexed by the demultiplexing section 204, correlation values at the points corresponding to the individual path locations and outputs the extracted correlation values to the RAKE combining section 208. Thereby, it is possible to obtain from the RAKE combining section 208 the control signals of all users that are multiplexed by using the CAZAC code $C_0$.

Hereinafter, the specific operations of the path detection section 205 and peak value extraction sections 206 and 207 according to the present exemplary embodiment will be described.

2. Path Detection and Peak Value Extraction

Figure 5:
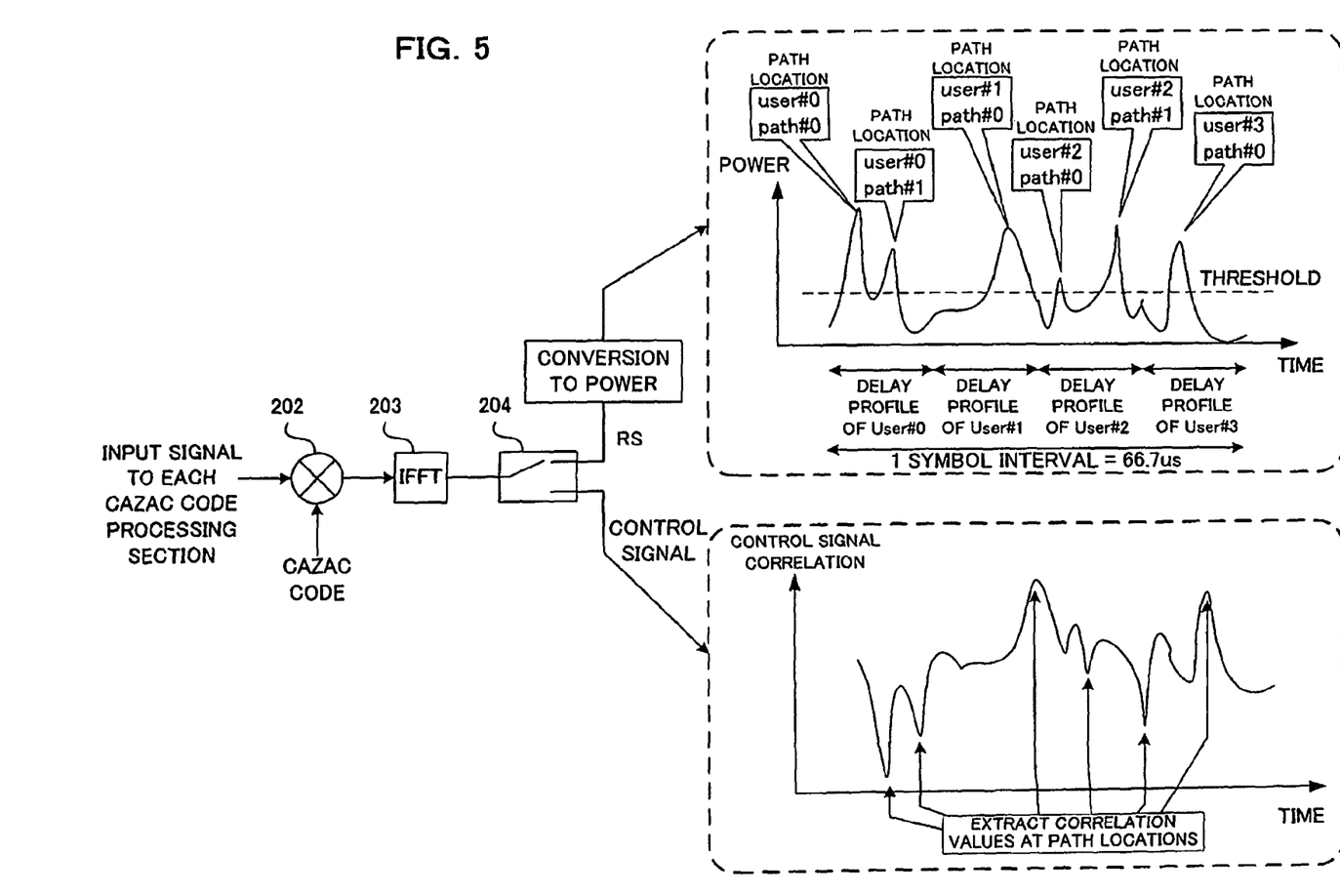
FIG. 5 is a schematic diagram showing an example of path detection operation and peak detection operation in the control signal demodulation device according to the present exemplary embodiment.

FIG. 5 is a schematic diagram showing an example of the path detection operation and peak value extraction operation of the control signal demodulation device according to the present exemplary embodiment. In FIGS. 4 and 5, the same functional blocks are denoted by the same reference numerals, and description thereof will be omitted.

First, when time-division-multiplexed reference signals and control signals are demultiplexed by the demultiplexing section 204, the reference signals only are sent to the path detection section 205. As described with reference to FIG. 3 earlier, reference signals represent the delay profiles of individual users that are multiplexed by cyclic shifts of a CAZAC code. In FIG. 5, shown are the delay profiles of four users #0 to #3 within one symbol interval (66.7 μs).

The path detection section 205 detects timings at which the reference signal sequence shows larger power than a threshold value, as path locations indicating the individual users' reception timings. Here, it is assumed that the user #0 has two paths #0 and #1, the user #1 has a path #0 only, the user #2 has two paths #0 and #1, and the user #3 has a path #0 only. The path detection section 205 outputs the detected path locations to each of the peak value extraction sections 206 and 207.

The peak value extraction section 206 extracts correlation values at the points corresponding to the path locations, from the reference signal sequence demultiplexed by the demultiplexing section 204. The peak value extraction section 207 extracts correlation values at the points corresponding to the path locations, from the control signal sequence demultiplexed by the demultiplexing section 204. Here, the correlation values of the reference signal peaks extracted by the peak value extraction sections 206 represent channel estimation values indicating changes in transmission path. Further, the correlation values of the control signal peaks extracted by the peak value extraction section 207 represent the results of dispreading of the transmitted control signals by using the CAZAC code.

3. Control Signal Demodulation Processing

Next, detailed description will be given of demodulation processing of control signals performed by the path detection section 205, peak value extraction sections 206 and 207, and RAKE combining section 208 according to the present exemplary embodiment shown in FIG. 4. Note that this demodulation processing function also can be implemented by executing programs on a program-controlled processor such as a CPU.

Figure 6:
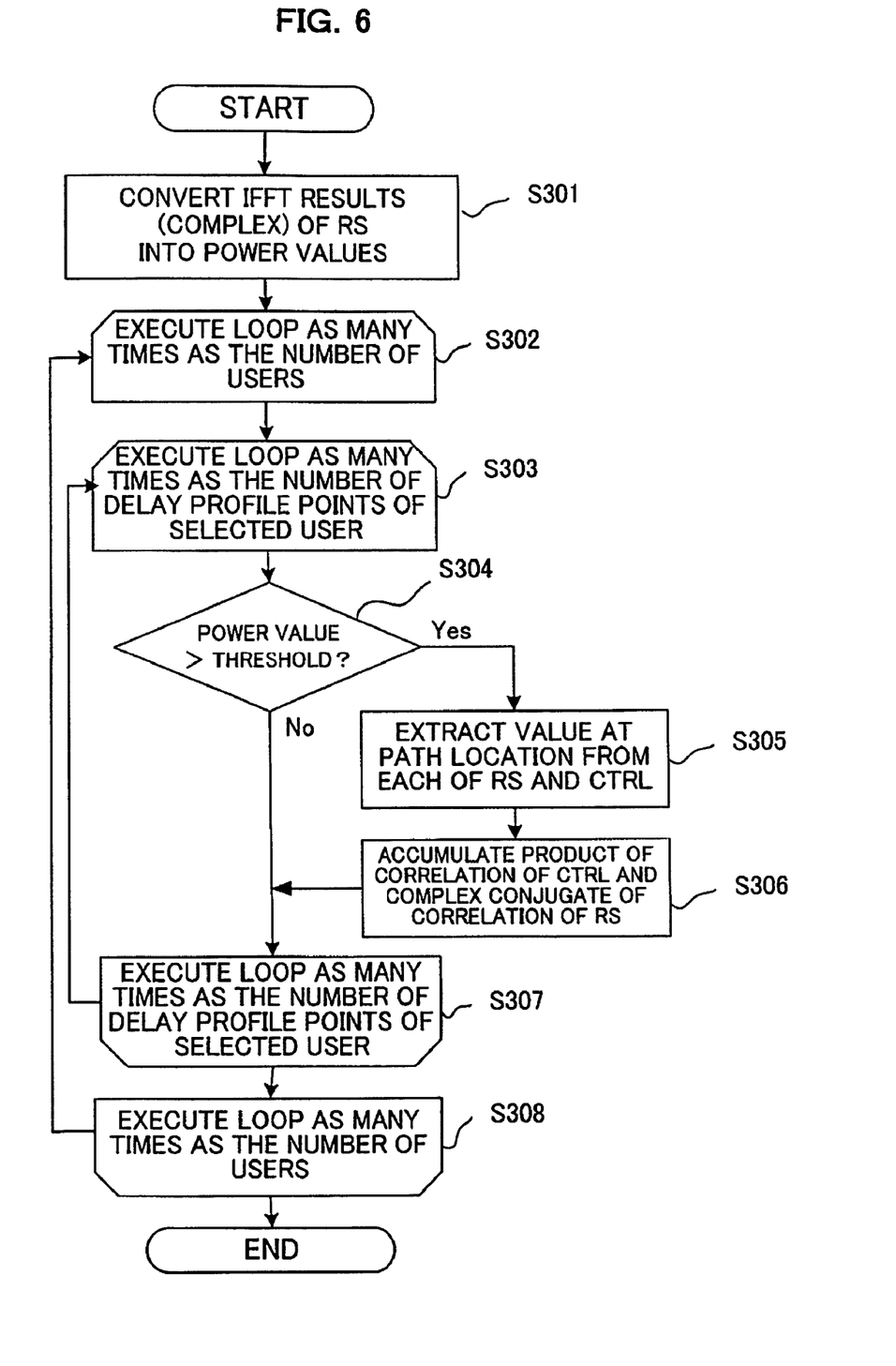
FIG. 6 is a flowchart showing a control signal demodulation method according to the present exemplary embodiment.

FIG. 6 is a flowchart showing a method for demodulating control signals according to the present exemplary embodiment. First, reference signals are demultiplexed by the demultiplexing section 204 and input to each of the path detection section 205 and the peak value extraction section 206. The path detection section 205 converts the signal values into power values by squaring the results of IFFT of the input reference signals (Step S301). As shown by the users' delay profiles in FIG. 5, the delay profiles of all users (four users in FIG. 5) that are multiplexed by cyclic shifts of a CAZAC code sequentially appear in the signal sequence within a certain symbol interval.

Subsequently, while every one of the users multiplexed by cyclic shifts is sequentially selected, the following processing steps S304 to S308 are repeated as many times as the number of the profile points of the selected user. The number of the profile points is the number of the path locations of the user. For example, the user #0 has two profile points in the example shown in FIG. 5.

First, the number of profile points is determined for a selected user (Steps S302 and S303). Then, the path detection section 205 compares the power value at one of the delay profile points of this user with a threshold level (indicated by a broken line in FIG. 5) (Step S304) and detects a timing where the power value exceeds the threshold level, as an effective path timing (path location) of this user. At this path location, the peak value extraction sections 206 and 207 extract the correlation values of the reference signal and of the control signal, respectively (Step S305). Since the reference signal value represents a variation incurred over the transmission path, the reference signal value is output to the RAKE combining section 208 as a combining coefficient. The RAKE combining section 208 accumulates the product of the correlation value of the control signal and the complex conjugate of the correlation value of the reference signal, thus outputting the result of demodulation of the control signal (Step S306).

The above-described steps S304 to S306 are carried out for every path of each user (Steps S307 and S308), whereby the demodulation results of the control signals of all users can be obtained in a batch.

4. Advantages

As described above, according to the present exemplary embodiment, at the time of demodulation of control signals, noise elimination processing such as filtering on the time axis for each user is not needed. Moreover, demodulation processing can be performed in a batch for all users that are multiplexed by cyclic shifts of the same CAZAC code. Furthermore, the reception quality of each user can be efficiently estimated from the respective reference signals of the multiple user terminals multiplexed. Owing to such demodulation processing that makes use of the CAZAC code characteristics, it is possible to increase efficiency in reception processing of control signals.

Note that, although the radio communications system that utilizes a CAZAC code for demodulation is described as an example in the foregoing exemplary embodiment, the present invention is not limited to such a system. For example, any type of code can be used as long as the code can orthogonalize reference signals and control signals as a result of cyclic shifts.

Further, the present invention can be applied not only to a base station device but also to a mobile station.

Moreover, although the LTE radio communications system is described as an example in the foregoing exemplary embodiment, the present invention is not limited to LTE radio communications systems but also can be applied other radio communications systems that include at least one base station and mobile stations.

The present invention can be applied to radio communications system in which demodulation processing of uplink or downlink control signals is performed. For example, the present invention can be applied to any of a base station and a mobile station in a mobile communications system.

The present invention may be embodied in other specific forms without departing from the spirit or essential characteristics thereof. The above-described exemplary embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A device for demodulating a control signal received from each of a plurality of radio terminals based on correlation in frequency domain between a predetermined code and a reception signal including control signals and reference signals received from the plurality of radio terminals, wherein orthogonality between the control signals and orthogonality between the reference signals are accomplished by cyclic shifts of the predetermined code, comprising:
   a demultiplexer for demultiplexing a reference signal component and a control signal component from a correlation profile of the correlation in frequency domain;
   a path detector for detecting a path location of each radio terminal from power of the reference signal component;
   an extractor for extracting a reference signal correlation value from the reference signal component corresponding to the path location and a control signal correlation value from the control signal component corresponding to the path location; and
   a combiner for combining the reference signal correlation value and the control signal correlation value to generate a control signal of each of the plurality of radio terminals.

2. The device according to claim 1, wherein the predetermined code is a Constant Amplitude Zero Auto-Correlation (CAZAC) code.

3. The device according to claim 1, wherein the correlation profile includes delay profiles for respective ones of the plurality of radio terminals, wherein the delay profiles are arranged in time sequence.

4. The device according to claim 1, wherein the path detector detects temporal locations at which the correlation profile exceeds a predetermined threshold value as path locations of respective ones of the radio terminal.

5. The device according to claim 1, wherein the combiner accumulates a product of a complex conjugate value of the reference signal correlation value and the control signal correlation value to generate the control signal of each of the plurality of radio terminals.

6. A method for demodulating a control signal received from each of a plurality of radio terminals based on correlation in frequency domain between a predetermined code and a reception signal including control signals and reference signals received from the plurality of radio terminals, wherein orthogonality between the control signals and orthogonality between the reference signals are accomplished by cyclic shifts of the predetermined code, comprising:
   demultiplexing a reference signal component and a control signal component from a correlation profile of the correlation in frequency domain;
   detecting a path location of each radio terminal from power of the reference signal component;
   extracting a reference signal correlation value from the reference signal component corresponding to the path location and a control signal correlation value from the control signal component corresponding to the path location; and
   combining the reference signal correlation value and the control signal correlation value to generate a control signal of each of the plurality of radio terminals.

7. The method according to claim 6, wherein the predetermined code is a Constant Amplitude Zero Auto-Correlation (CAZAC) code.

8. The method according to claim 6, wherein the correlation profile includes delay profiles for respective ones of the plurality of radio terminals, wherein the delay profiles are arranged in time sequence.

9. The method according to claim 6, wherein the path locations of respective ones of the radio terminal are temporal locations at which the correlation profile exceeds a predetermined threshold value.

10. The method according to claim 6, wherein the control signal of each of the plurality of radio terminals is obtained by accumulating a product of a complex conjugate value of the reference signal correlation value and the control signal correlation value to generate.

11. A radio communications system comprising the device according to claim 1.

12. A non-transitory computer-readable medium encoded with a program for instructing a computer to function as a device for demodulating a control signal received from each of a plurality of radio terminals based on correlation in frequency domain between a predetermined code and a reception signal including control signals and reference signals received from the plurality of radio terminals, wherein orthogonality between the control signals and orthogonality between the reference signals are accomplished by cyclic shifts of the predetermined code, the computer program causing the computer to:

demultiplex a reference signal component and a control signal component from a correlation profile of the correlation in frequency domain;

detect a path location of each radio terminal from power of the reference signal component;

extract a reference signal correlation value from the reference signal component corresponding to the path location and a control signal correlation value from the control signal component corresponding to the path location; and combine the reference signal correlation value and the control signal correlation value to generate a control signal of each of the plurality of radio terminals.

13. The non-transitory computer-readable medium according to claim 12, wherein the predetermined code is a Constant Amplitude Zero Auto-Correlation (CAZAC) code.

* * * * *